United States Patent [19]

Grienke

[11] Patent Number: 4,764,064
[45] Date of Patent: Aug. 16, 1988

[54] TOOL CHANGER

[75] Inventor: Lyle C. Grienke, Rice, Minn.

[73] Assignee: Komo Machine Incorporated, St. Cloud, Minn.

[21] Appl. No.: 101,373

[22] Filed: Sep. 25, 1987

[51] Int. Cl.⁴ .......................... B23C 5/26; B23B 31/10
[52] U.S. Cl. ................................. 409/233; 408/239 A
[58] Field of Search .............. 409/233, 232, 231, 234; 408/239 A, 239 R; 279/1 TS, 8, 19.4, 50, 43

[56] References Cited

U.S. PATENT DOCUMENTS

| | | | |
|---|---|---|---|
| 3,374,711 | 3/1968 | Saunders | 409/233 |
| 3,481,248 | 12/1969 | Engstrom | 409/233 |
| 3,520,228 | 7/1970 | Wohlfeil | 409/233 |
| 3,593,614 | 7/1971 | Galbarini et al. | 409/232 |
| 3,603,203 | 9/1971 | Rhodes | 409/232 |
| 3,680,437 | 8/1972 | Cravens, Jr. | 409/233 |
| 3,691,899 | 9/1972 | Antonietto et al. | 409/232 |
| 3,753,383 | 8/1973 | Schmidt | 409/233 |
| 3,797,956 | 3/1974 | Bayer et al. | 408/35 |
| 3,823,642 | 7/1974 | Jerue | 409/233 |
| 3,835,858 | 9/1974 | Hagen | 128/305 |
| 3,898,911 | 8/1975 | DeCaussin | 409/233 |
| 4,068,559 | 1/1978 | Schmid, Jr. et al. | 409/233 |
| 4,075,927 | 2/1978 | Frazier | 409/233 |
| 4,131,054 | 12/1978 | Johnson et al. | 409/233 |
| 4,135,848 | 1/1979 | Hughes et al. | 408/239 A |
| 4,226,562 | 10/1980 | Schmid et al. | 409/233 |
| 4,290,720 | 9/1981 | Ferreira | 409/233 |
| 4,347,753 | 9/1982 | Claussen et al. | 74/110 |
| 4,352,612 | 10/1982 | Benatti | 409/233 |
| 4,356,609 | 11/1982 | Wollermann | 29/48.5 |
| 4,382,730 | 5/1983 | Reinisch | 409/233 |
| 4,411,568 | 10/1983 | Röhm | 409/233 |
| 4,432,559 | 2/1984 | Rasmussen | 279/4 |
| 4,511,295 | 4/1984 | Razdobreev | 409/233 |
| 4,553,886 | 11/1985 | Vasilchenko et al. | 409/233 |
| 4,589,808 | 5/1986 | O'Connor | 409/233 |
| 4,605,349 | 8/1986 | Bone | 409/233 X |
| 4,632,613 | 12/1986 | Wollermann | 409/233 |
| 4,668,137 | 5/1987 | Iwakura | 409/233 |

FOREIGN PATENT DOCUMENTS

| | | | |
|---|---|---|---|
| 85839 | 5/1985 | Japan | 409/233 |
| 1206411 | 9/1970 | United Kingdom | 409/233 |
| 1390931 | 4/1975 | United Kingdom | 409/233 |

*Primary Examiner*—William R. Briggs
*Attorney, Agent, or Firm*—Kinney & Lange

[57] ABSTRACT

A tool changer formed by a power assisted draw bar to obtain and lock, as well as release and expel, standard tapered tool holders used with machine tools. Two components, a collet cylinder and a flared stem, together comprise the locking mechanism and protrude through the unmodified spindle cylinder of a commercially available machine tool. The powered actuator assembly, which can separately translate these components, is mounted on top of the machine tool's power head.

6 Claims, 6 Drawing Sheets

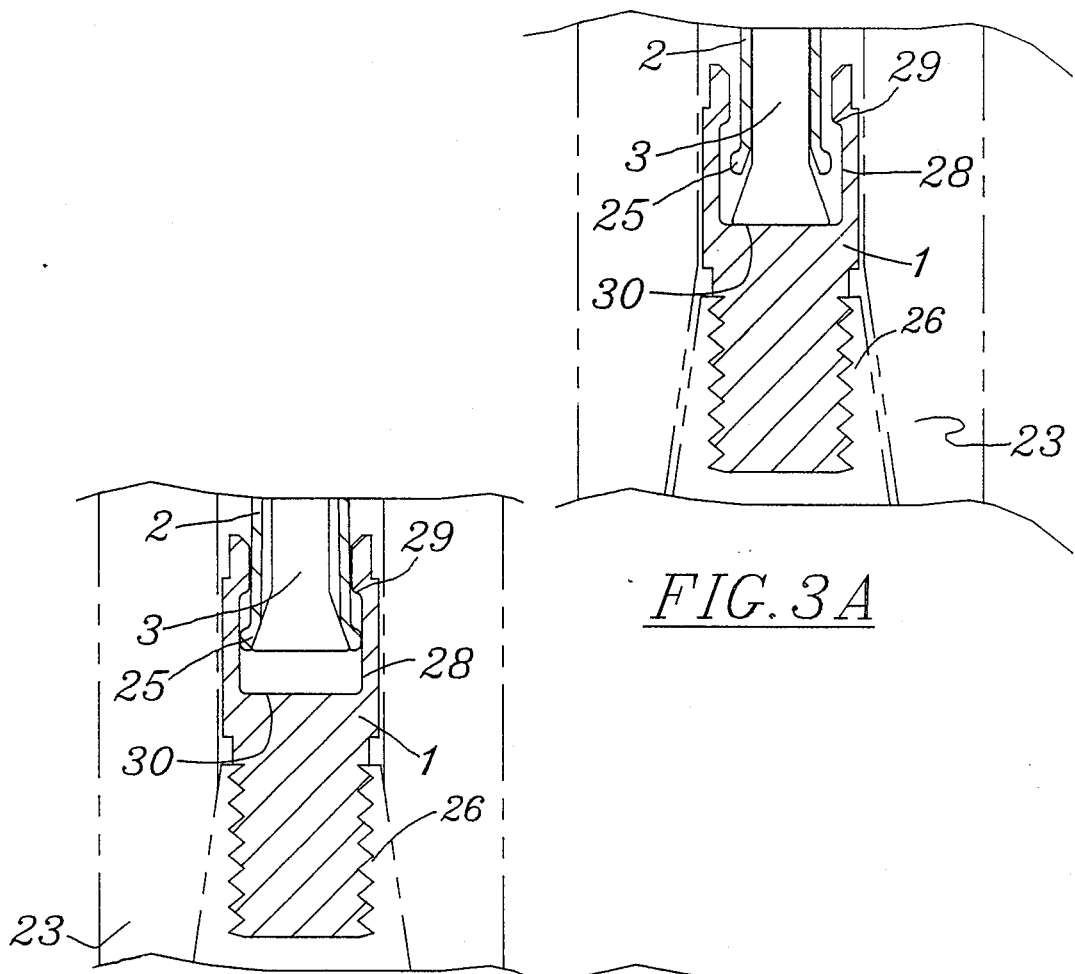
FIG. 3A
FIG. 3B
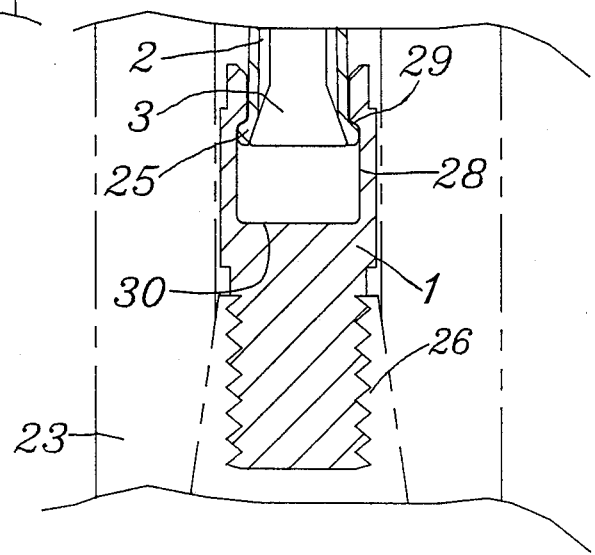
FIG. 3C

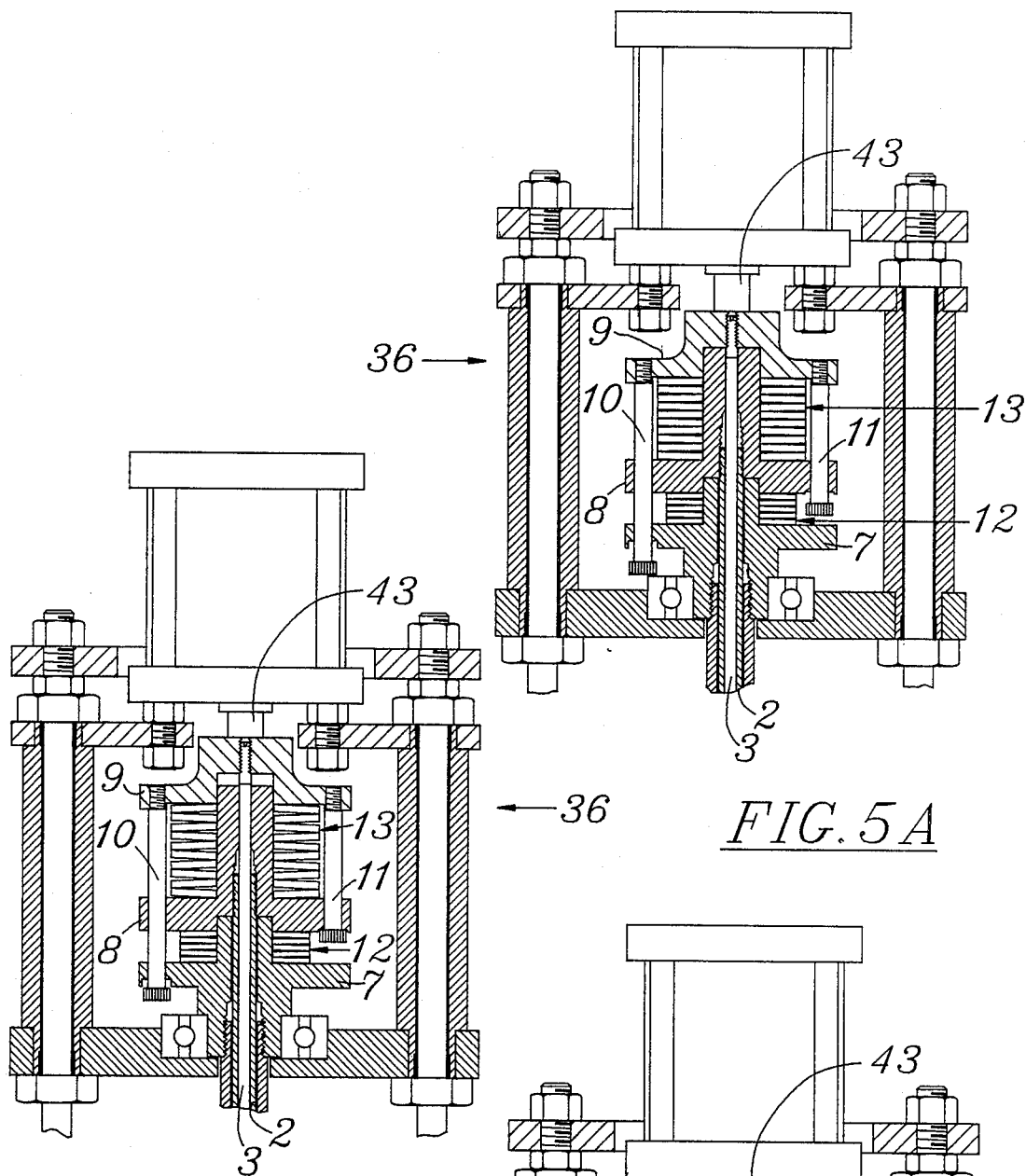
*FIG.5A*
*FIG.5B*
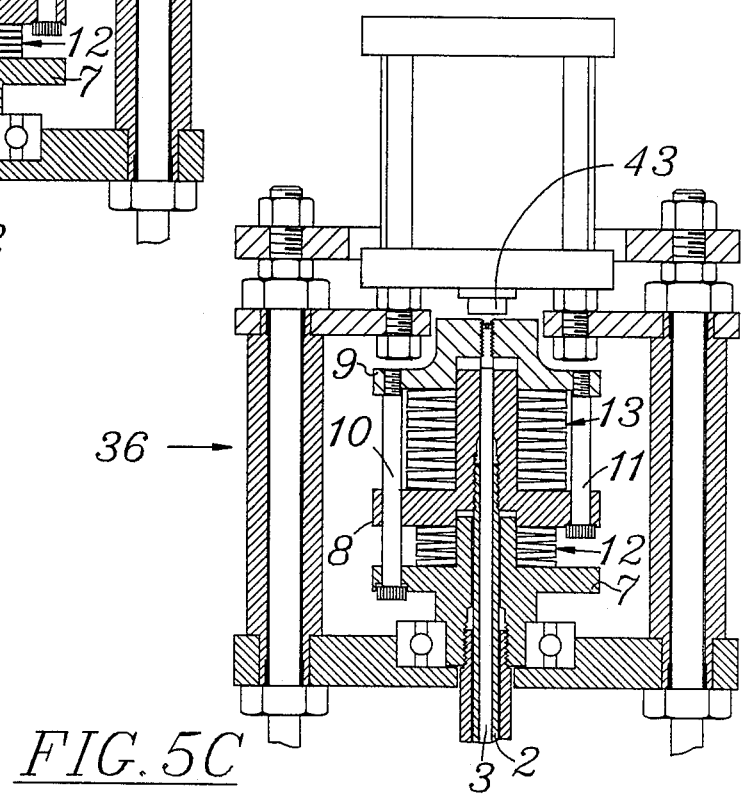
*FIG.5C*

TOOL CHANGER

BACKGROUND OF THE INVENTION

1. Field of the Invention

The present invention generally relates to tool changers for either manually operated or automated machine tools and, more particularly, to a tool changer which obtains and locks, as well as unlocks and positively ejects, tapered tool holders.

2. Description of the Prior Art

Considerable effort has been dedicated to the design of power assisted devices for the obtaining and securing of tapered tool holders in the spindles of machine tools. An increase in interest in and need for these devices has resulted from the large number of programmable machine tools with automatic tool changers currently in use.

Conventional vertical milling machines utilize a draw bar, threaded at one end, which when inserted into the tapped cavity of a standard tapered tool holder and rotated will seat the tool holder against the complementary surface of the spindle. A large number of existing designs of power assisted draw bars use hydraulic, pneumatic or electric motors to rotate the draw bars. While these power assisted devices are considerably quicker in operation than is a manual draw bar, additional rapidity is desirable. In general, these devices are noisy and slow since many incorporate an impact wrench approach. Automating these devices allows their use with automatic tool changers. However, occasional failures to engage the threaded draw bar when used with these automatic tool changers can result in dropped tool holders.

Alternative arrangements replace the foregoing rotary draw bar motion devices with one relying on axial motion, doing so by using locking fingers which contact and lock the tool holder. These also have several drawbacks, as these devices tend to be complicated and comprised of a large number of parts internal to the spindle. Spindles having the sizes required to contain these complex mechanisms are only found on larger machine tools. Further, some prevent translating the spindle to change depth of cut thus requiring a movable table to support the work piece. Finally, remachining of the spindle and/or tool holders is often required, necessitating disassembly and removal of the spindle when retrofitting a machine tool with a power draw bar. This greatly adds to the fabrication and installation cost of these devices. There also exist other designs which apply to a specific and unique machine tool design and are not adaptable to standard models.

Thus, there is a desire for a rapidly, but sure, operating tool changer. This changer should be able to be retrofitted to commercially available rotary action machine tools with little modification of same. Further, such a change should be at relatively low cost.

SUMMARY OF THE INVENTION

The present invention provides a tool changer having an actuator means mounted on top of the power head of a commercially available rotary action machine tool and centered on the axis of the rotatable spindle cylinder. Power can be supplied by any convenient means such as either pneumatic or hydraulic means. Attached to the actuator means and protruding downwardly through a passageway in the interior of the standard, unmodified spindle cylinder along its axis is the locking mechanism comprised of two components, a collet cylinder having a flared locking cylinder extending through a passageway therein.

After the hollow terminus of the tool holder adapter, which can be inexpensively added to each standard tool holder, has been slid upwardly over the ends of the collet cylinder and the flared locking cylinder, locking extensions at the end of the collet cylinder are forced against the inner adapter surface. This occurs by first translating the flared locking cylinder deeper into the spindle and then both the collet cylinder and the flared locking cylinder deeper into the spindle. The tool holder is thereby raised and locked. To unlock and eject the tool holder, the above motions are reversed.

DETAILED DESCRIPTION OF THE PREFERRED EMBODIMENTS

Many machine tools currently in use are equipped with spindles configured to accept tapered shank tool holders. These tool holders have a mechanism to secure the tool, such as a collet or chuck, at one end of the tool holder. The other end of the tool holder is tapped to accept a conventional threaded draw bar. This invention provides a means of changing tool holders, using a small amount of motion along the axis of the spindle of the assembly used in place of such a draw bar, an assembly having but two components. This invention allows the use of those spindles and tool holders, unmodified, as conventionally used with commercially available machine tools.

Figure 1:
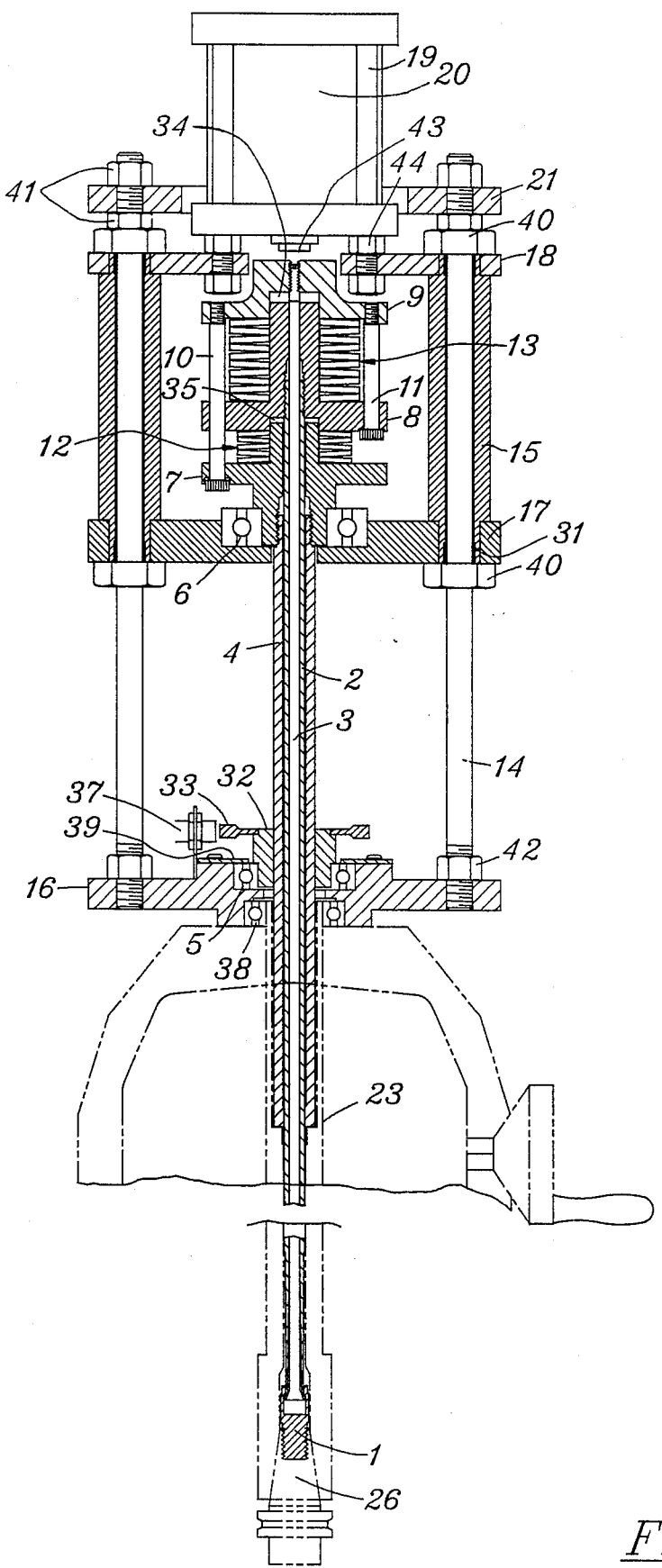
FIG. 1 is an axial cross section view through the present invention.

Referring now to FIG. 1, a power operated tool changer assembly is shown mounted on the power head of a small vertical milling machine. The machine outline and components standard to the machine are shown by means of dashed lines.

Figure 2:
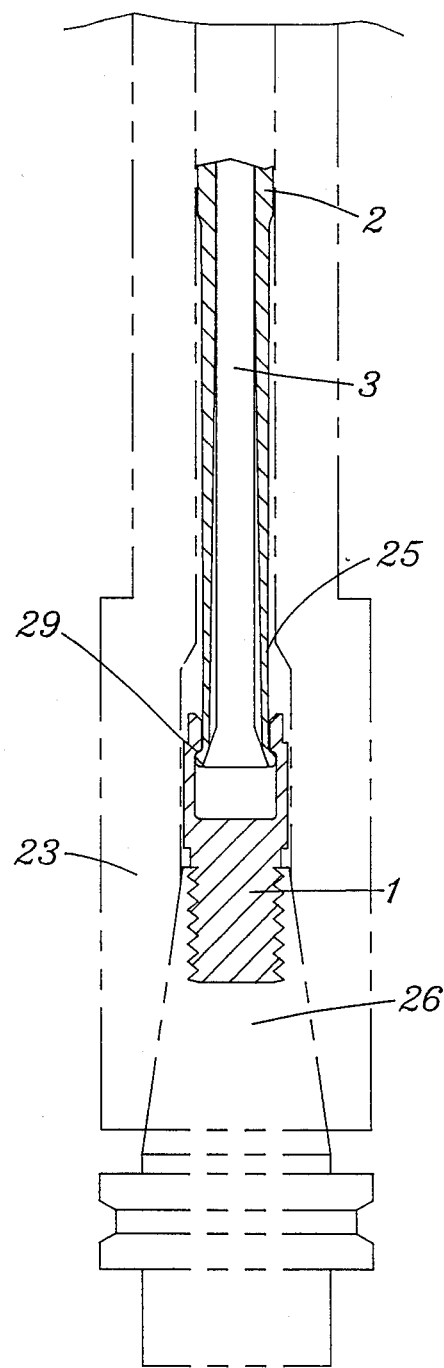
FIG. 2 is a fragmentary axial cross section view of a portion of the invention shown in FIG. 1, FIGS. 3A, 3B and 3C are further fragmentary axial cross section views of the portion of the invention shown in FIG. 2.

FIG. 2 shows the details of a locking mechanism, a tool holder adapter and a tool holder arrangement. The tool holder adapter, 1, is a simple body of revolution with a male thread at one end corresponding to the female thread regularly provided in a tapered tool holder, 26. The opposite end of adapter 1 contains a cylindrical cavity, 28, to accept the locking mechanism. The cavity has a smaller diameter at its opening to form a collar, 29, allowing the transmission of upward forces to the adapter and to provide a seat to accurately position adapter 1 with respect to the locking mechanism. Each standard tool holder 26 can easily and inexpensively be equipped with such an adapter to form a tool holder assembly.

The locking mechanism consists of two simple components, a collet cylinder or retracting tube, 2, and a flared locking cylinder or expanding stem, 3. Stem 3 is mounted concentrically and slidably retractable within the passageway of tube 2, which in turn is positioned inside the passageway in spindle cylinder 23. Retracting tube 2 is a hollow cylinder, threaded at its upper end to allow engagement with an actuator assembly, 24, shown in detail hereinafter in FIG. 4. The locking end of retracting tube 2 is machined to the shape shown, with slots cut longitudinal to form the outwardly expandable locking extensions or locking fingers, 25. Locking fingers 25 are heat treated for the purpose of hardening. This arrangement can be more fully seen in FIGS. 6A and 6B.

Figure 4:
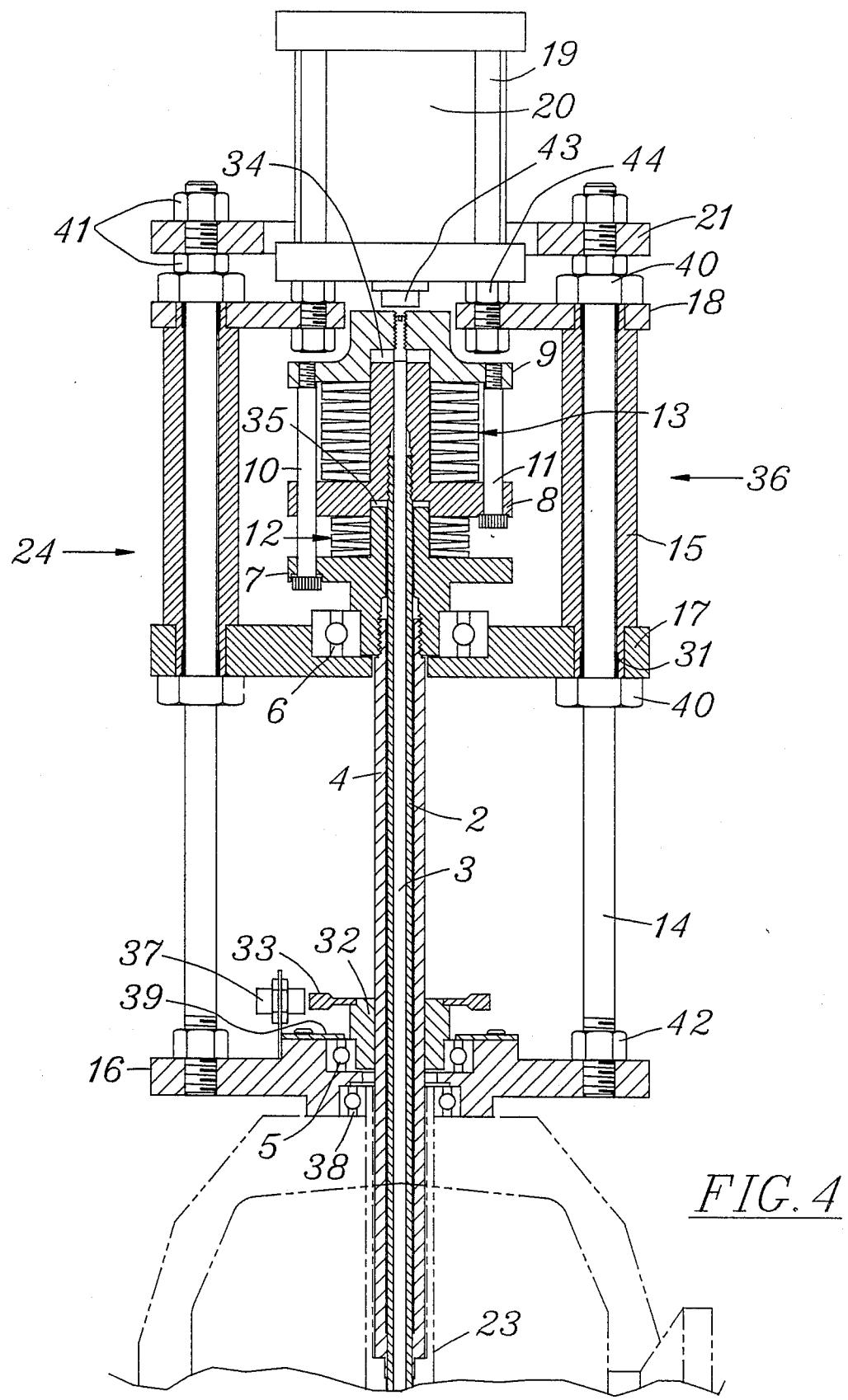
FIG. 4 is another fragmentary axial cross section view of a portion of the present invention shown in FIG. 1, FIGS. 5A, 5B and 5C are further fragmentary axial cross section views of the portion of the invention shown in FIG. 4, and FIGS. 6A and 6B are alternative views of the portion of the invention shown in FIG. 2.

Expanding stem 3 is a cylindrical rod, threaded at the upper end thereof, for engagement with actuator 24, again as shown in FIG. 4. The lower hardened end of the expanding stem is outwardly conical in shape. Expanding stem 3 is located concentrically inside retracting tube 2. Retracting tube 2 and expanding stem 3 are allowed to move slidably with respect to each other and with respect to spindle cylinder 23.

Figure 6A:
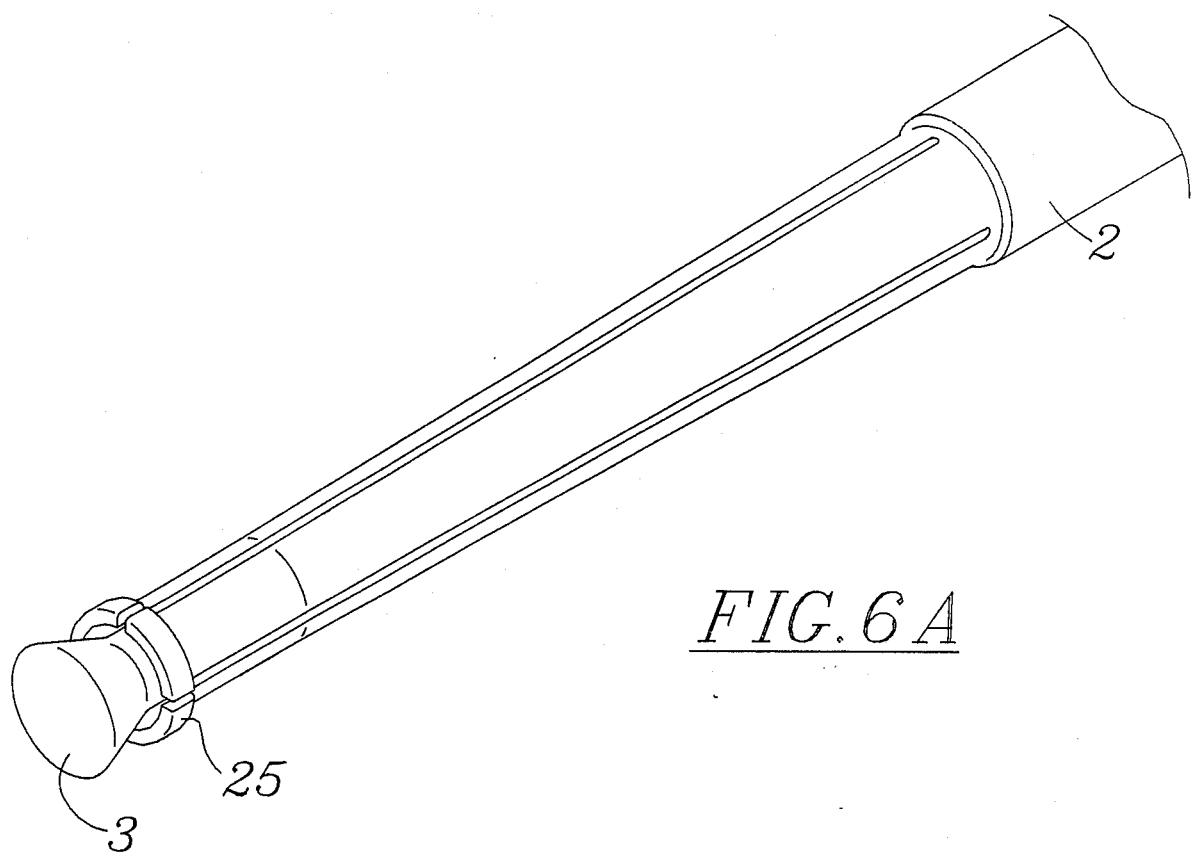
Figure 6B:
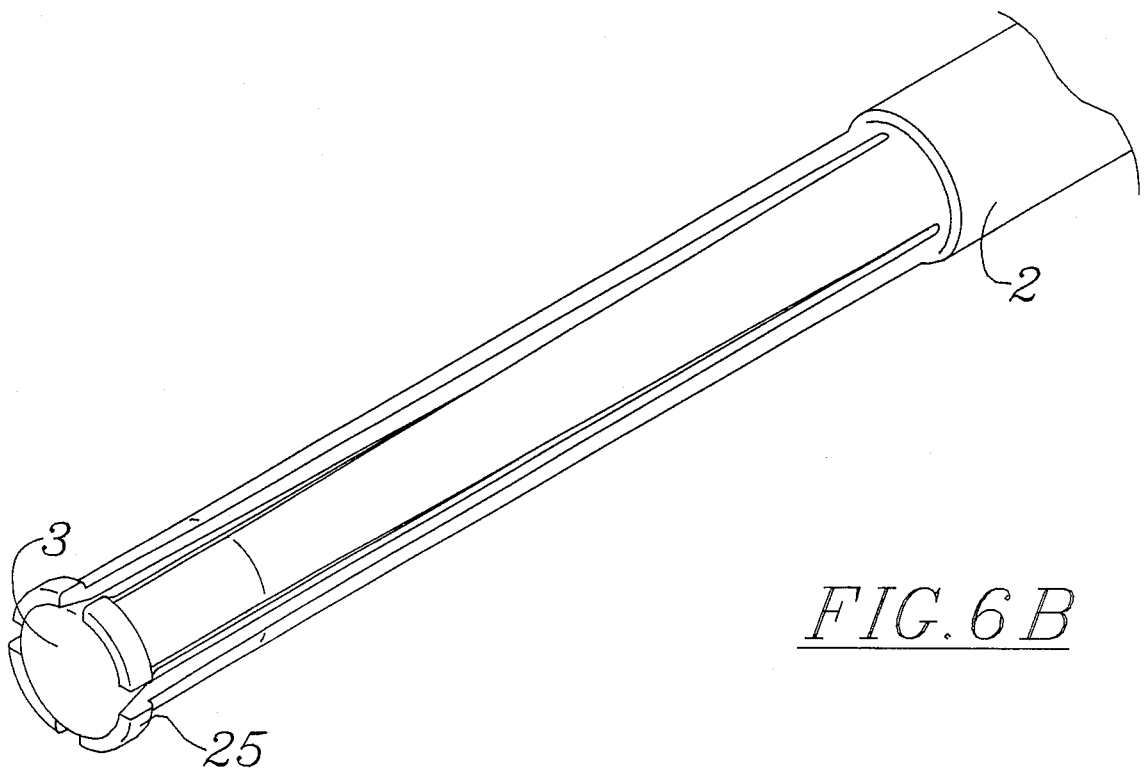

To fully appreciate the simplicity of the locking mechanism, consider its sequence of operation with the aid of FIGS. 3A, 3B and 3C and with FIGS. 6A and 6B. The manner in which the motions of the components of the locking mechanism are caused by actuator 24 will be described in detail hereinafter. FIGS. 3A and 6B show the locking mechanism in its unlocked position. Retracting tube 2 and expanding stem 3 are in that relative position with the conically flared end of stem 3 furthest out from tube 2, and with both at the lowest position take by them with respect to spindle cylinder 23. Locking fingers 25 of retracting tube 2 are collapsed against that portion of expanding stem 3 having a cross section with dimensions that are smaller than the dimensions of the cross section of the passageway in tube 2. In this arrangement, locking fingers 25 on tube 2 and the conically flared end of stem 3 can enter cavity 28 of adapter 1 on tool holder 26 past collar 29. Expanding stem 3 is then first drawn upward, while holding retracting tube 2 stationary, causing the conically flared portion of expanding stem 3 to force outwardly locking fingers 25 thereby forcing them against the inner surface of adapter cavity 28. This intermediate locking mechanism position is present in FIG. 3B.

Thereafter, simultaneous upward motion occurs of expanding stem 3, retracting tube 2 and tool holder adapter 1 (and tool holder 26). After the tapered surface of tool holder 26 is firmly seated against the complementary surface of spindle cylinder 23, the locking mechanism continues to move upwardly, sliding locking fingers 25 along the inner surface of adapter cavity 28 until locking fingers 25 are seated against adapter cavity collar 29, as shown in FIGS. 3C and 6A.

Reversing the aforementioned sequence of steps results in unlocking the tool holder adapter 1 (and tool holder 26). In most instances, tool holder adapter 1 will break free from the complementary surface of spindle cylinder 23 at the first downward motion of retracting tube 2. However, the invention provides the means to positively separate the tool holder adapter 1 from this surface at spindle cylinder 23, since expanding stem 3 will not stop its downward travel until it has contacted the bottom surface 30 of adapter cavity 28 if adapter 1 sticks to spindle cylinder 23, and so will displace tool holder adapter 1 to an axial position away from its locked position, as can be seen in FIG. 3A.

To mount actuator 24, shown in more detail in FIG. 4, the upper bearing cap, situated on the power head, 45, of the machine tool, is replaced with a base plate, 16. Base plate 16 houses an upper spindle bearing, 38, as well as a lower actuator assembly bearing, 5. The latter is held in place axially by a bearing retainer, 39. The two main guide bolts, 14, are threaded into base plate 16 and secured by locking nuts, 42.

At an extension of the axis of spindle cylinder 23, hollow support tube 4 is provided forming an extension of spindle 23 and is capable of sliding up or down by passing through bearings 5 and 38. At its lower end, tube 4 is press fitted into the upper end of spindle cylinder 23. The upper end of support tube 4 is threaded into a lower spring retainer, 7, which is press fitted into the inner race of a carriage bearing, 6. The outer race of carriage bearing 6 is press fitted into a bearing plate, 17.

The frame of a carriage assembly, 36, is comprised of bearing plate 17 and a cylinder mounting plate, 18, situated on either side of two guide sleeves, 15, over main guide bolts 14 which are held in place by the four nuts 40. Carriage assembly 36 can move along guide bolts 14 by sleeves 5 sliding on them if tube 4 and spindle cylinder 23 are moved up and down in changing tools or changing the depth of cut with a tool, etc. This motion is guided by oiled bushings, 31, which are pressed into the guide sleeves 15 and move slidably along the guide bolts 14. Travel is upwardly limited by an adjustable top plate, 21, held in place by four nuts, 41.

The aforementioned lower spring retainer 7 serves as a base and centering guide for a lower spring stack 12, which consists of five Belleville spring washers stacked vertically. Lower spring stack 12 exerts a force upwardly against a middle spring retainer, 8, which in turn supports and centers an upper spring stack, 13, consisting of ten Belleville spring washers. This invention allows lower, middle and upper spring retainers 7, 8 and 9, respectively, to move along the axis of spindle cylinder 23 with respect to each other. The maximum distance between upper and middle spring retainers 8 and 9 is limited by three upper spring retention bolts, 11. The compression of upper spring stack 13, and consequently the minimum distance between upper and middle spring retainers 8 and 9, is limited by the depth of a machined cylindrical cavity, 34, in upper spring retainer 9. Similarly, the relative motion between upper and lower spring retainers 9 and 7 is restricted by three lower spring retention bolts, 10, and by the depth of a mechanical cavity, 35, in middle spring retainer 8. Because upper spring stack 13 is significantly "stiffer" through having more springs than its lower spring stack 12, sequential movement of the components of the locking mechanism are achieved.

Retracting tube 2 and expanding stem 3 are situated concentrically interior to the spindle cylinder 23 and its extension, support tube 4. The upper end of the retracting tube 2 is threaded into, and therefore moves with, middle spring retainer 8, while the upper end of expanding stem 3 is threaded into upper spring retainer 9, which defines its motion.

The device which exerts the force along the axis of spindle cylinder 23 to compress the spring stacks and cause the necessary motion of the locking mechanism parts is the power cylinder, 20. While this will generally be in the form of a pneumatic device, this invention allows the use of hydraulics as well. Power cylinder 20, which is an integral part of the carriage assembly 36, is secured to a cylinder mount, 18, by means of cylinder tie rods, 19, and eight nuts, 44. One can see that all of the components providing the locking and ejection forces, the power cylinder 20 and the upper and lower spring stacks 13 and 12, are part of slidable carriage assembly 36. Therefore, none of these forces are transmitted to power head 45 of the machine tool, preventing possible damage to the case of power head 45 due to fatigue loading.

To reiterate, carriage assembly 36, through support tube (or spindle extension) 4, is fastened to spindle cylinder 23 existing in the machine tool at the time of retrofit. All components related to the springs and spring retention mechanism (7 through 13) in carriage assembly 36, and therefore the locking mechanism, are as a result connected to the upper end of support tube 4. These components both rotate with spindle cylinder 23, when it is selected to do so by the machine operator, and translate with the spindle cylinder 23 in either direction along the axis thereof, if that motion is selected by the operator. Lower spring retainer 7 is connected to the rest of carriage assembly 36 (components 14, 15, 18 through 20, 31, 40 and 44) by means of carriage assembly bearing 6. These components move with spindle cylinder 23 along its axis in either direction but do not rotate.

A description of the sequence of operation of actuator 24 with some positions taken during this sequence being displayed graphically in FIGS. 5A, 5B and 5C, will begin at the point of the locking mechanism entering tool holder adapter 1, as was done in the description of the sequence of operation of the locking mechanism in connection with FIGS. 3A, 3B and 3C. At this point, carriage 36 is usually placed in its uppermost position, i.e. tool holder 26 is at its furthest position from the work piece. Relative to carriage 36, the piston, 43, of power cylinder 20, upper and middle spring retainer 9 and 8, and therefore retracting tube 2 and expanding stem 3, are positioned as far downward as possible as shown in FIG. 5A. Both Belleville spring stacks 12 and 13 are compressed.

As the force of power cylinder piston 43 is caused to decrease after locking fingers 25 and the conically flared end of stem 3 have entered cavity 28 of adapter 1, upper spring stack 13, having the stronger spring force, pushes upper spring retainer 9 upward, therefore drawing expanding stem 3 upward, until the limit of upper spring retention bolts 11 has been reached. FIG. 5B presents this intermediate configuration. As the force of the power cylinder piston 43 continues to decrease, lower spring stack 12 forces both middle and upper spring retainers 8 and 9 upward until the limit of the lower spring retention bolts is reached. This results in the simultaneous upward motion of both tube 2 and stem 3 of the locking mechanism, concluding with tool holder 26 in the fully locked position as shown in FIG. 3C. At this point, the machine tool is ready for operation.

With tool holder 26 firmly locked in spindle cylinder 23 and with the power cylinder piston 43 spaced apart from upper spring retainer 9, rotation of the spindle cylinder 23 and the aforementioned connected components can be initiated. Tool holder 26 can then be translated toward the work piece and cutting depth is controlled by the extent of this motion. During this operation, the entire carriage assembly 36 moves along the axis of spindle cylinder 23 as guided by carriage guide sleeves 15 and bushings 31 sliding over the carriage guide bolts 14. After the cutting operation is complete or is to be stopped for some other reason, the translation motion can be reversed - spindle cylinder 23 can be raised and its rotational motion can be stopped before initiating a desired unlocking of tool holder 26.

To disengage tool holder 26, power cylinder piston 43 is caused to exert a force on upper spring retainer 9 which is transferred by upper spring stack 13 to middle spring retainer 8 to compress weaker lower spring stack 12. This allows the simultaneous downward motion of both tube 2 and stem 3 of the locking mechanism. After middle spring retainer 8 can compress spring stack 12 no further against lower spring retainer 7, increasing of the power cylinder piston 43 force compresses upper spring stack 13 which results in a continued lowering of only expanding stem 3. At the point upper spring stack retainer 9 can compress spring stack 13 no further against middle spring stack retainer 8, expanding stem 3 has allowed locking fingers 25 to collapse and has pushed tool holder 27 free of spindle cylinder 23, as shown in FIG. 3A.

Automated machine tools with variable speed control require a reliable signal corresponding to spindle rotational speed. The components to provide this feature can easily be incorporated into actuator 24 and is most clearly shown in FIG. 4. A wheel, 33, with a number of equally spaced magnetized points around its circumference is attached to a guide hub, 32, which is pressed into the inner, rotating race of lower actuator assembly bearing 5. As a result, this assembly, consisting of guide hub 32 and magnetized wheel 33, remains stationary with respect to translation of spindle cylinder 23, while being rotationally driven by support tube 4. Support tube 4, which translates with spindle cylinder 23, rotationally drives magnetized wheel 33 by means of a sliding key in guide hub 32. A sensor, 37, which provides an output signal, is fastened to baseplate 16.

Although the present invention has been described with reference to preferred embodiments, workers skilled in the art will recognize that changes may be made in form and detail without departing from the spirit and scope of the invention.

What is claimed is:

1. A tool changer for use with a rotary driver having a spindle means mounted in a frame means, said spindle means being capable with respect to said frame means of both being selectively rotated about an axis thereof and selectively translated in either direction along that axis, said spindle means having a spindle passageway therein extending along said spindle axis between first and second ends thereof, said tool changer comprising:

a collet cylinder means positioned at least partly within said spindle passageway, said collet cylinder means having a passageway therein between first and second ends thereof which is substantially parallel to said spindle passageway such that a collet cylinder means wall occurs about said spindle passageway with there being locking extensions formed at said collet cylinder means second end each having a locking lip extending therefrom away from said collet cylinder passageway;

a flared locking cylinder means positioned at least partly within said collet cylinder passageway and having first and second ends between which a contained portion thereof has dimensions such that it can pass through said collet cylinder passageway, said flared locking cylinder means second end and said contained portion having a flared portion therebetween of such shape and dimension as to prevent it from passing along said collet cylinder passageway, said flared locking cylinder means second end being located nearer said collet cylinder means second end than said collet cylinder means first end; and an actuator means in which said spindle means, said collet cylinder means and said flared locking cylinder means first ends are affixed such that said collet cylinder means first end can be moved in a direction parallel to said spindle axis with respect to said spindle means first end, and such that said flared locking cylinder means first end can be moved in a direction parallel to said spindle axis with respect to both said spindle means and said collet cylinder means first ends.

2. The apparatus of claim 1 wherein said locking extensions are formed by separation openings provided in said collet cylinder means wall at said second end thereof to thereby provide separated wall portions at that end, each said separated wall portion having said locking lip extending therefrom.

3. The apparatus of claim 1 wherein said actuator means comprises:

a movable base means in which said spindle means is affixed at said first end thereof, and having a movable base means passageway coaxial with said spindle passageway and extending therefrom;

a collet cylinder carrier means in which said collet cylinder means is affixed at said first end thereof and having a cylinder carrier means passageway coaxial with said spindle passageway and extending from said movable base means passageway, said collet cylinder means extending through said movable base means passageway; and a locking cylinder carrier means in which said flared locking cylinder means is affixed at said first end thereof, said flared locking cylinder means extending through both said movable base means passageway and said collet cylinder passageway.

4. The apparatus of claim 3 wherein said locking cylinder carrier means is separated from said collet cylinder carrier means by a first spring means, and said collet cylinder means is separated from said movable base means by a second spring means.

5. The apparatus of claim 3 wherein said movable base means is a part of a carriage frame means adapted to support a power actuator means such that said power actuator means can selectively exert a force on said locking cylinder carrier means.

6. The apparatus of claim 5 wherein said carriage frame means is supported by carriage frame guide means affixed to a stationary base means having a stationary base means passageway coaxial with said spindle passageway and extending thereabout, said spindle means, said collet cylinder means, and said flared locking cylinder means all extending through said stationary base means passageway.

* * * * *